United States Patent [19]

Haushofer et al.

[11] Patent Number: 5,013,591
[45] Date of Patent: May 7, 1991

[54] BUILDING SHEETING AND METHOD OF ITS MANUFACTURE

[75] Inventors: Bert Haushofer, Königstein Ts.; Ernst Scherp, Brucköbel; Wilfried Schumacher, Offenbach; Petru Sabau, Frankfurt, all of Fed. Rep. of Germany

[73] Assignee: Rutgerswerke Aktiengesellschaft, Frankfurt am Main, Fed. Rep. of Germany

[21] Appl. No.: 348,382

[22] Filed: May 8, 1989

[30] Foreign Application Priority Data

May 10, 1988 [DE] Fed. Rep. of Germany ....... 3815915

[51] Int. Cl.$^5$ .......................... B32B 7/12; B05D 3/02; B05D 11/04
[52] U.S. Cl. ................................... 428/40; 427/374.1; 428/327; 428/343; 428/347; 428/352; 428/354; 428/489
[58] Field of Search ................. 428/489, 40, 343, 347, 428/352, 354; 524/68; 427/374.1

[56] References Cited

U.S. PATENT DOCUMENTS

| | | | |
|---|---|---|---|
| 4,368,228 | 1/1983 | Gorgati | 428/489 X |
| 4,381,357 | 4/1983 | Vettern et al. | 524/68 |
| 4,420,524 | 12/1983 | Gorgati | 428/489 X |
| 4,595,636 | 6/1986 | Wiercinsky et al. | 428/489 |
| 4,600,635 | 7/1986 | Wiercinsky et al. | 428/489 X |

Primary Examiner—Thomas J. Herbert
Attorney, Agent, or Firm—Beveridge, DeGrandi & Weilacher

[57] ABSTRACT

A bituminous building sheeting which is compatible with hot mopping bitumen and bituminous cold adhesives and whose covering mass is modified with APP and IPP. The mass, homogenized under high shear forces is cooled off after the application of 180° to 200° C. at a cooling speed of not more than 120 K/min. Polymer spherulites form on the surface thereby which improve the adhesiveness and prevent oily components from exuding out of the bitumen.

7 Claims, 2 Drawing Sheets

BUILDING SHEETING AND METHOD OF ITS MANUFACTURE

BACKGROUND OF THE INVENTION

The invention relates to a building sheeting with polymeric bitumen for construction purposes and a method of its manufacture.

Building sheetings with and without reinforcing carrier based on bitumen modified with polymers are known. Elastomers and polyolefins in particular are used as polymer. In practice, building sheetings with SBS (styrene-butadiene-styrene) or APP (atactic polypropylene) have gained acceptance. Both polymers bring about broadening of the plasticity span. SBS-modified bituminous building sheeting can be built in, for example, in the pouring method with blown bitumen, or can be furnished self-adherent; however, they are rendered sensitive to UV radiation and therefore as external building sheeting, they must be provided with a protective layer. Bituminous sheeting modified with APP cannot be attached with oxidized bitumen nor with elastomer contact adhesives.

APP-modified polymer sheetings exhibit inferior flexibility at low temperatures. In order to prevent this, an ethylene-propylene copolymerizate is frequently added. However, the surface of such bituminous building sheetings becomes tacky as a result of oily components exuding from the mixture so that sticking during storage results if the sheetings are not covered. In order to prevent this, DE-OS 19 41 630 suggests that up to 10% by weight sulfur be added to the bituminous mass. However, $H_2S$ is produced during processing, which makes an expensive purification of exhaust gas necessary.

The migration of the oily components is also a reason for the poor compatibility with adhesive bitumen. An adhesion over the entire area and a combining of the overlapping seams with adhesive bitumen, e.g. according to the pouring method, is therefore not possible. The use of solvent-containing cold adhesives is also excluded on account of the sensitivity to solvents (lecture of N. A. Hendriks: Polymer-Bitumen Roof Sheeting, its Quality and Processing Properties; anniversary of the VEDAG-Koln, 1986). Therefore, APP-bitumen building sheetings are marketed exclusively as torching sheets (brochure, Homo-Plast Company for Homogeneous Insulation—and Sealing Technology mbH). The sheets are frequently covered on both sides with plastic films or provided on one side with a mineral dispersion.

In order to prevent the migration, the use of IPP (isotactic polypropylene) has been suggested as modifying agent for bituminous roofing material. However, these materials tend to dehomogenize in a hot state. Even when the cooling is very rapid, a very coarse structure is obtained which corresponds to a bitumen-filler-system and hardly changes the bitumen properties.

There was therefore the problem of developing building sheeting of the above-mentioned type with polypropylene-modified, bituminous covering materials which are compatible both with adhesive bitumen and with bituminous, cold, self-adhesive compositions.

SUMMARY OF THE INVENTION

The invention solves this by means of building sheeting in which at least one covering layer consists of a mixture of bitumen with a penetration between 70 and 420.1/10 mm and a softening point (R. and K.) between 20° and 50° C., 10 to 30% by weight of a homo and/or copolymer based on APP, 5 to 20% by weight IPP, preferably with a melt flow index between 20 and 40, and optionally, other customary modifying agents, whereby the free surfaces of this layer facing outward contain crystalline polypropylene in the form of spherulites and comprise neither either a mineral chipping nor a film covering.

BRIEF DESCRIPTION OF THE FIGURES

The advantageous features of this invention will become more evident from the following Detailed Description and the attached figures, wherein.

DESCRIPTION OF THE INVENTION

The building sheeting can be unsupported film without carrier which can be fixed over its entire surface with adhesive bitumen or also with commercially available bituminous cold adhesives. In a preferred embodiment, the unsupported building sheeting of the invention is provided on one side with a bituminous, cold, self-adhering layer which is covered with a removable separating film or with a siliconized paper.

However, the building sheeting can also contain a customary reinforcing insert consisting of fleece, fabric, mesh, placed or knit fabric made from organic or inorganic fibers. The underside of the sheeting can be provided with a cold adhesive layer which is covered with a removable separating film or a siliconized paper. In this manner, a cold, self-adhering, bituminous roof sheeting is obtained.

Cold, self-adhering roof sheetings are known. They are usually either sprinkled, with the exception of their edges, with mineral substances, which renders their manufacture more difficult, or they are covered on top with an adhesion promoting plastic film in order to make the adhesion of the edges possible at the construction site without additional cold adhesive materials. According to the invention, neither a covering nor a sprinkling is necessary for the building sheeting. It was surprisingly found that not only does no exudation occur on the surface of the sheeting during storage or after it has been laid but also that a surface which is less sensitive to solvents is obtained. The sheetings covered with bituminous cold self-adhesive laid with 8 cm overlap exhibit no weakening of the longitudinal and butt joints even after a rather long storage at 70° C.

An ethylene-propylene copolymer is used in particular as copolymer based on APP. Other copolymerizates which improve the flexibility at low temperatures can also be used.

Plasticizers, elastomers, EPDM or resins also can be added as modifying agents in addition to customary fillers in an amount up to 15% of the polypropylene-modified bitumen.

Since, on the one hand, definite maximum viscosities of the bituminous materials are given, depending on the manufacturing method of the building sheeting of the invention, e.g. on a customary roof sheeting or foil pouring production machine, and, on the other hand, however, the relatively high polymer additives result in a considerable rise in viscosity, a soft bitumen, e.g. B 200 to B 400, is preferably used as bitumen component. Harder bitumen types are also conceivable if a plasticizing agent such as resins or oils is added or if another processing technique is used which allows higher viscosities.

Since the sheeting of the invention is compatible with adhesive bitumen, it can also be coated as waterproof sheeting on the bottom with blown bitumen which can be powdered with talcum or covered with a foil. In this manner, more economical sheetings can be manufactured since the addition of polymer to the waterproofed layer can be eliminated.

EXAMPLE

Figure 1:
FIG. 1 shows a fluorescence microscope photograph of the cross-section of the sheeting material made in accordance with the invention.
Figure 2:
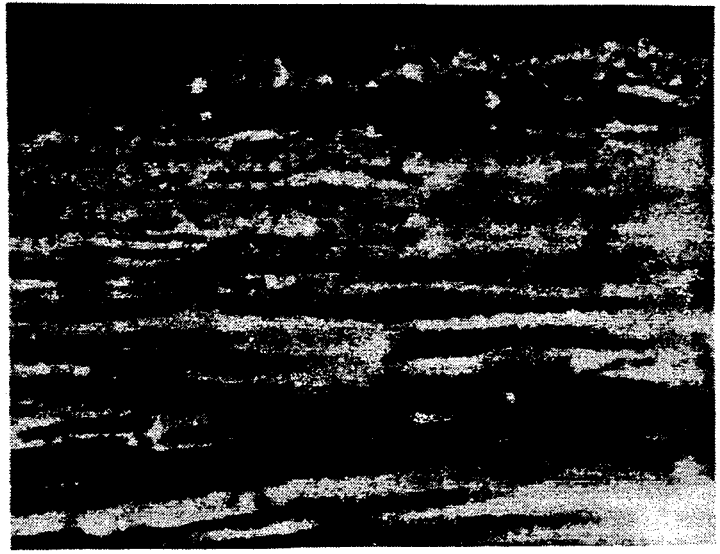
FIG. 2 shows a layered structure wherein the bitumen and polymer bitumen layers alternate.

FIG. 1 shows a photograph with a fluorescence microscope of a cross-section through a sheeting of the invention. By way of comparison thereto, FIG. 2 shows a section through a sheeting with a cover layer of the same formulation of substances which, however, was cooled down at a higher temperature gradient of 300K/min.

In FIG. 1, the bitumen is surrounded in a net-like manner by the polymer bitumen. This prevents the migration of the low-molecular components to the surface. On the other hand, FIG. 2 shows a layer structure in which bitumen layers and polymer bitumen layers alternate. Since the layers are connected to each other, a more rapid exudation of oil on the surface can come about as a consequence of weather effects.

The sheeting is manufactured as follows:

65% by weight bitumen B 200 is mixed at 200° C. in an agitator vessel with 23% by weight of a mixture based on APP containing 70% by weight ethylene, and 12% by weight IPP with a melting index of 22. The mixture is homogenized in a toothed attrition mill with a slot of 0.1 mm. The finished mass is applied in a roofing sheet production machine in a layer thickness of 2 mm onto the top of an impregnated polyester fiber fleece with a weight per unit area of 250g/m$^2$ and cooled off with a cooling speed of 100K/min. from 180° to 40° C. The bottom of the fleece is coated with a layer 1 mm thick of a bituminous cold self-adhesive from the melt and covered with a siliconized paper. The sheeting exhibits a dry, dull surface without oil exuding even after a storage of one month at 70° C.

Two 10 cm wide strips of the sheeting are adhered to one another with an overlap of 8 cm. The adhesion site has a peel strength after 30 min. of 7.5N/cm. The test is repeated after the strips have been stored 10 days or three months at 70° C. in a drying oven. Thereafter, the adhesion site has a peel strength of 11.3 and 14.9N/cm. A comparison of the numerical values clearly shows that no weakening of the adhered seam has occurred as a result of migrated oils. Rather, the strength has increased as a result of diffusion of the components present in the cold self-adhesive.

The adhesive site of the reference sheeting with an upper covering layer of bitumen modified with APP according to the state of the art but otherwise with the same construction, has a peel strength of only 0.8N/cm after 30 min. and after 10 days or 3 months at 70° C., a peel strength of a steady 1.0N/cm. The low values can be explained on the one hand by the specific surface formation and on the other hand by the exudation of low-molecular components on the polymer bitumen surface. The slight increase in strength is conditioned by the improved adhesion due to the heating, which is, however, largely cancelled out by the exudation in the border areas.

The mixing of the components of the covering material takes place in a temperature range between 160° and 220° C. The melt is then aftertreated for homogenization e.g. in a mill with a high shear rate.

The material is poured at 180° to 200° C. to a film or applied onto a carrier and cooled off with a cooling speed of a maximum of 120K/min., preferably 60 to 80 K/min. The homogenization and cooling speed are decisive thereby for the developing of the crystalline structure of the sheeting.

Figure 3:
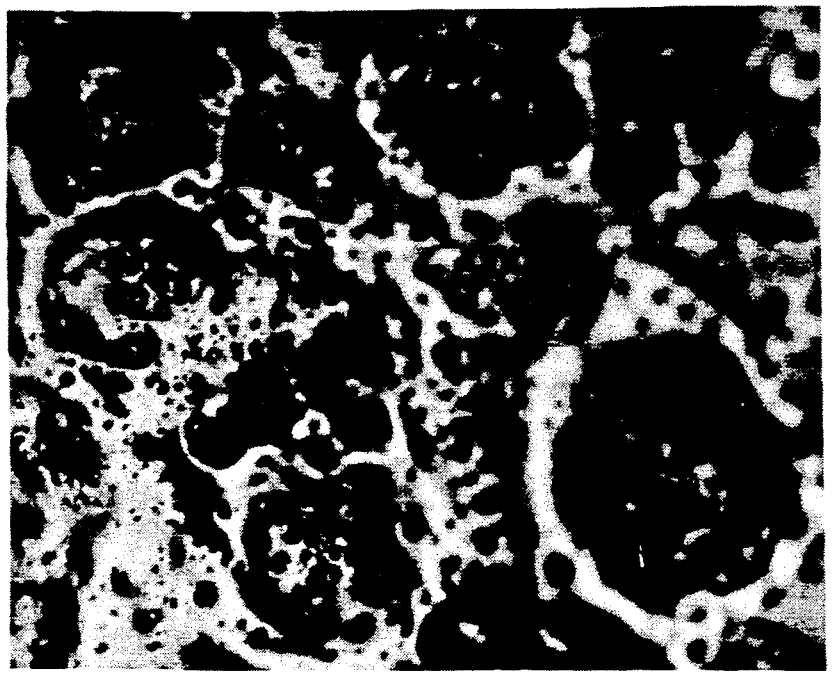
FIG. 3 shows a microscope photograph of the surface of the sheeting when cooled at the rate of 100° K./min.
Figure 4:
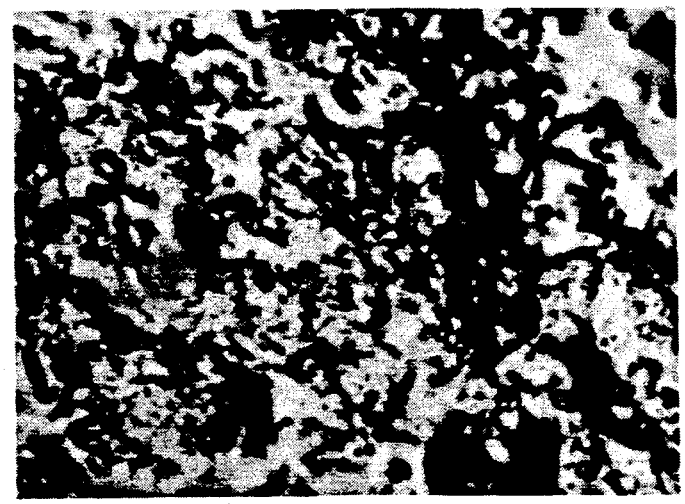
FIG. 4 shows a microscope photograph of the surface of the sheeting when cooled at the rate of 2400° K./min.

This is also shown by a comparison of the photographs taken with a wide-field photomicroscope. The surfaces of the two sheetings with the covering material in accordance with the invention as in the example were cooled off from 180° C. with a temperature gradient of 100K/min. (FIG. 3) and from 2400K/min. (FIG. 4), slightly etched with sulfuric acid and examined under the microscope with a 950× enlargement with interference phase-contrast technology.

The photographs clearly show that the polymer (dark areas) crystallizes out as a result of the slower cooling in spherulites with a diameter up to 30 μm. These spherulites bring about a surface roughness which improves the adhesion of the adhesive and prevent the exudation of the mixture. If the cooling is rapid, no spherulites can form. The uniform distribution of bitumen (bright areas) and polymer produce a smooth surface with lesser adhesion of the adhesive.

We claim:

1. A building sheeting including a polymeric bitumen comprising at least one covering layer which includes a mixture of bitumen having a penetration between 70 and 420.1/10 mm and a softening point between 20° and 50° C., 10 to 30% by weight of a homo and/or copolymer based on atactic polypropylene (APP), 5 to 20% by weight isotatic polypropylene (IPP), with a melt flow index between 20 and 40, and further wherein the surface of the outer layer of the building sheeting contains crystalline polypropylene in the form of spherulites.

2. The building sheeting according to claim 1, wherein said building sheeting is an unsupported film.

3. The building sheeting according to claim 2, wherein the bottom of the building sheeting has a bituminous cold, self-adhesive layer which is laminated with a separating film.

4. The building sheeting according to claim 1, wherein said building sheeting contains a reinforcing insert.

5. The building sheeting according to claim 4, wherein the bottom of the building sheeting has a cold, self-adhesive layer or a torching layer.

6. A method for manufacturing the building sheeting according to claim 1, on a foil pouring machine or a customary roofing sheet production machine, comprising mixing bitumen at 160° to 220° C. in an agitator vessel with the polymers, homogenizing the mixture under high shear forces, pouring the finished mass at a temperature of 180° to 200° C. to a film and cooling with a cooling speed of a maximum of 120K/min.

7. A method according to claim 6, wherein the finished mass is applied onto a carrier layer as cover layer and is cooled with a cooling speed of a maximum of 120K/min.

* * * * *